Feb. 8, 1927.

H. NORRIS, JR 1,616,819

CHECK VALVE

Filed Feb. 4, 1926

Inventor
H. Norris, Jr.

By Clarence A. O'Brien
Attorney

Patented Feb. 8, 1927.

1,616,819

UNITED STATES PATENT OFFICE.

HENRY NORRIS, JR., OF WESTPORT, MARYLAND.

CHECK VALVE.

Application filed February 4, 1926. Serial No. 85,964.

This invention relates to check valves for use in fluid pressure lines for preventing the back flow of the fluid, but permitting the passage therethrough in one direction as is well known.

The primary object of the invention resides in the provision of such a check valve wherein the same may be regulated so as to be opened by fluid under various pressures, and that will not interfere with the passage of the fluid therethrough and that will immediately check the flow of the fluid in a reverse direction when the pressure from the main line is cut off.

A further and important object is to provide such a check valve wherein the valve unit per se may be bodily removed from the casing for adjustment, cleaning, repair, or renewal purposes.

With the foregoing, and other objects in view as the nature of the invention will be better understood, the same comprises the novel form, combination and arrangement of parts hereinafter more fully described, shown in the accompanying drawing and claimed.

In the drawing wherein like reference characters indicate corresponding parts throughout the various views.

Figure 1:
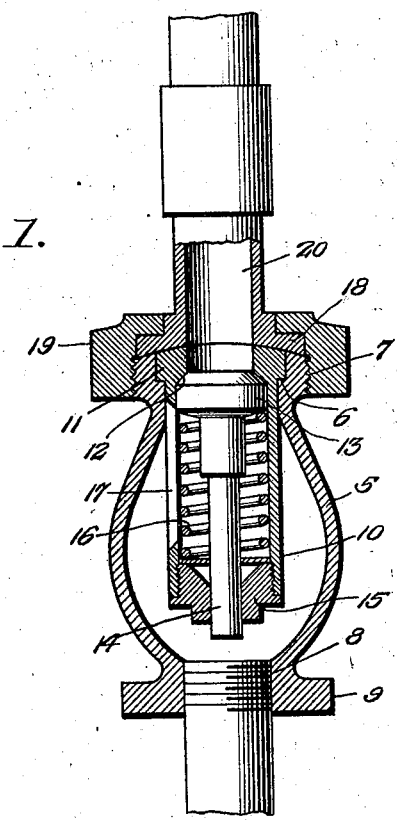
Figure 1 is a detail vertical section of the valve.
Figure 2:
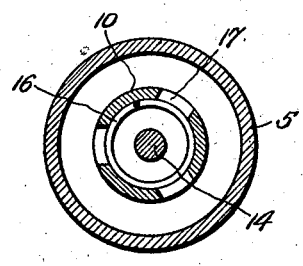
Figure 2 is a transverse section thereof.

Now having particular reference to the drawing, my novel valve constitutes the provision of a casing 5 of suitable shape open at its opposite end. One open end of the casing 5 is formed with an internal annular shoulder 6 while at this end said casing is externally screw threaded as at 7, the opposite open end of said casing being internally threaded as at 8 and being formed with an angular shoulder 9 in order that said casing may be properly threaded upon the threaded end of a pipe line, (not shown).

Adapted to be removably disposed within the casing 5 is a valve unit consisting of a cylindrical sleeve 10 that is flanged at its upper end as at 11 to enable it to rest upon the shoulder 6 of the casing 5 in a manner as clearly shown in Figure 1. The bore of the upper end of this sleeve 10 is of reduced diameter for providing a shoulder 12 that is beveled so as to function as a valve seat for a disc valve 13 that is freely movable within a cylinder, beneath said shoulder. This valve disc is formed upon one end of a valve stem 14 that is freely slidable through a plug 15 threaded within the lower end of the sleeve 10 also as clearly shown in Figure 1. Surrounding the stem 14 between the plug 15 and valve 13 is an expansible coil spring 16 that normally maintains the valve in closed position upon the seat, the tension of this spring being adjusted to the proper degree by reason of the plug 15.

The cylindrical sleeve 10 is formed intermediate the lower end thereof and the seat 12 with slots 17 in order that the fluid passing into the sleeve and unseating the valve 13 will discharge therethrough into the valve casing 5 and thence outwardly thereof.

The top surface of the sleeve 10 as well as the upper edge of the casing 5 is slightly rounded in order to provide a seat for a concave annular plate 18 that is to be secured in position thereon through medium of a locking gland 19 that has threaded engagement with the upper externally threaded end of the casing 5. Said plate 18 is formed with a central opening from which rises a pipe section 20 that is threaded at its upper end in order that the valve may be properly inserted within the pressure line.

It will be obvious that when the valve is installed, the pressure passing into the pipe section 20 and the sleeve 10 will depress the valve 13 permitting the fluid to enter the casing 5 through the slot 17. Immediately upon release of the pressure, the expansible spring 16 will cause the valve 13 to close, obviously preventing the back pressure through the sleeve and pipe section 20.

It will thus be seen that I have provided a highly novel, simple, and efficient form of check valve that is well adapted for all the purposes heretofore designated, and even though I have herein shown and described the valve as applied to certain detailed structural elements, it is nevertheless to be understood that the modifications may be had therein without effecting the spirit and scope of the appended claim.

Having thus described the invention, what I claim as new and desire to secure by Letters Patent is:—

In a check valve of the class described, a hollow open ended casing adapted to be installed with a pressure line, an internal annular shoulder formed in the upper inlet end of the casing, a removable valve unit arranged within the casing and comprising a cylindrical sleeve, a flange formed on the upper end of the sleeve and adapted to rest upon said shoulder, an internal annular seat formed within the sleeve adjacent the flanged upper end thereof, said sleeve being formed with fluid passage slots beneath the seat, a disc valve slidably arranged within the cylinder beneath the seat, spring means for normally maintaining the disc valve in position against the seat for permitting the same to be opened under pressure of the fluid entering the valve unit, means whereby the tension of the spring may be regulated, the upper end of the casing and flanged portion of the sleeve being slightly rounded, a concaved annular plate seated thereon, a pipe section extending upwardly from the annular plate and providing an inlet, and a locking gland surrounding the annular plate and threaded on the peripheral edge of the flange on the casing.

In testimony whereof I affix my signature.

HENRY NORRIS, Jr.